United States Patent
Umeda

Patent Number: 5,287,130
Date of Patent: Feb. 15, 1994

[54] PICTURE PROJECTING DEVICE

[75] Inventor: Katsuhiko Umeda, Tokyo, Japan

[73] Assignee: Jamco Corporation, Tokyo, Japan

[21] Appl. No.: 990,187

[22] Filed: Dec. 14, 1992

[30] Foreign Application Priority Data

Jan. 28, 1992 [JP] Japan .................................. 4-035865

[51] Int. Cl.⁵ .......................................... G03B 21/00
[52] U.S. Cl. .................................................... 353/20
[58] Field of Search ........................... 353/20, 29, 122; 359/443, 449, 452, 458

[56] References Cited

U.S. PATENT DOCUMENTS

| | | | |
|---|---|---|---|
| 3,350,982 | 11/1967 | Marks | 353/20 |
| 4,928,123 | 5/1990 | Takafuji | 353/20 |
| 5,148,309 | 9/1992 | Yamada et al. | 359/443 |

*Primary Examiner*—William A. Cuchlinski, Jr.
*Assistant Examiner*—William C. Dowling
*Attorney, Agent, or Firm*—Armstrong, Westerman, Hattori, McLeland & Naughton

[57] ABSTRACT

The present invention offers a picture projecting device which projects a clear picture even in a bright environment by cutting out the influence of outer light, regardless of the kind of projector used.

On the surface of a screen 20 inside an airplane, a first polarizing film 22 is put on. Further, a second polarizing film 32 is put on the input portion of outer incident light such as window glasses 9 or cover 8 of the room light. The second polarizing film 32 has the same polarizing trait as that of the first polarizing film 22, but they are placed so that the plane of polarization of the second polarizing film 32 differs from that of the first polarizing film 22 by 90°. The outer incident light H passing through the second polarizing film 32 enters the screen 20 as a polarized transmission light h1. The light will be reduced completely by the first polarizing film 22 placed on the screen and will not reflect.

9 Claims, 4 Drawing Sheets

PICTURE PROJECTING DEVICE

BACKGROUND OF THE INVENTION

1. Field of the Invention

This invention relates to a picture projecting device which is capable of projecting a clear picture in a bright environment.

2. Description of the Prior Art

When showing data to a number of people at a meeting, presentation, class and the like, devices such as video projectors, overhead projectors, or slides are used to enlarge the data and to project them onto a screen.

When doing so, the sunlight coming in from the window or the light from the room light reflected on the screen make it difficult to see the projected pictures, so there was a need to close the curtains of the windows and turn out the light to make the room dark.

However, the darkness of the room was inconvenient for the listeners who needed to read printed material or take a memo, and there was a device such as spotlight needed at their side.

So, in Japanese Laid-open Utility Model No. 3-5147, there is an idea mentioned where a polarizing board having the same polarizing trait as that of the output portion of the liquid crystal panel of a liquid crystal projector is used as the screen so that the influence of outer light would be reduced.

The idea taught in the Utility Model could only reduce the influence of outer light when a picture from a liquid crystal projector was projected to a transmitting screen.

But in an airplane where a video projector is used, all the blinds on the windows had to be shut as well as turning off the room light to cut off outer light when projecting a video, and passengers were troubled by having to shut the blind on the window by themselves. So, there was inconvenience in having to trouble even the passengers who did not want to see the video.

Therefore, the present invention offers a picture projecting device which projects a clear picture even in a bright environment by cutting out the influence of outer light, regardless of the kind of projector used.

SUMMARY OF THE INVENTION

The picture projecting device of the present invention comprises a polarizing film put onto the input portion of outer incident light upon the screen having a plane of polarization with a phase differing by 90° from that of the polarizing film put onto the screen for projecting pictures. Further, the polarizing film put onto the screen has a plane of polarization with the same phase as that of the projection light.

Outer incident light from all directions are polarized by letting them pass through a polarizing film before entering the screen. The polarizing film on the screen has a plane of polarization differing from that on the input portion of outer incident light by 90°, so the incident light on the screen reduces 100% and will not reflect.

DESCRIPTION OF THE PREFERRED EMBODIMENTS

An embodiment of the picture projecting device of the present invention being used inside an airplane will be explained with reference to the drawings.

Figure 1:
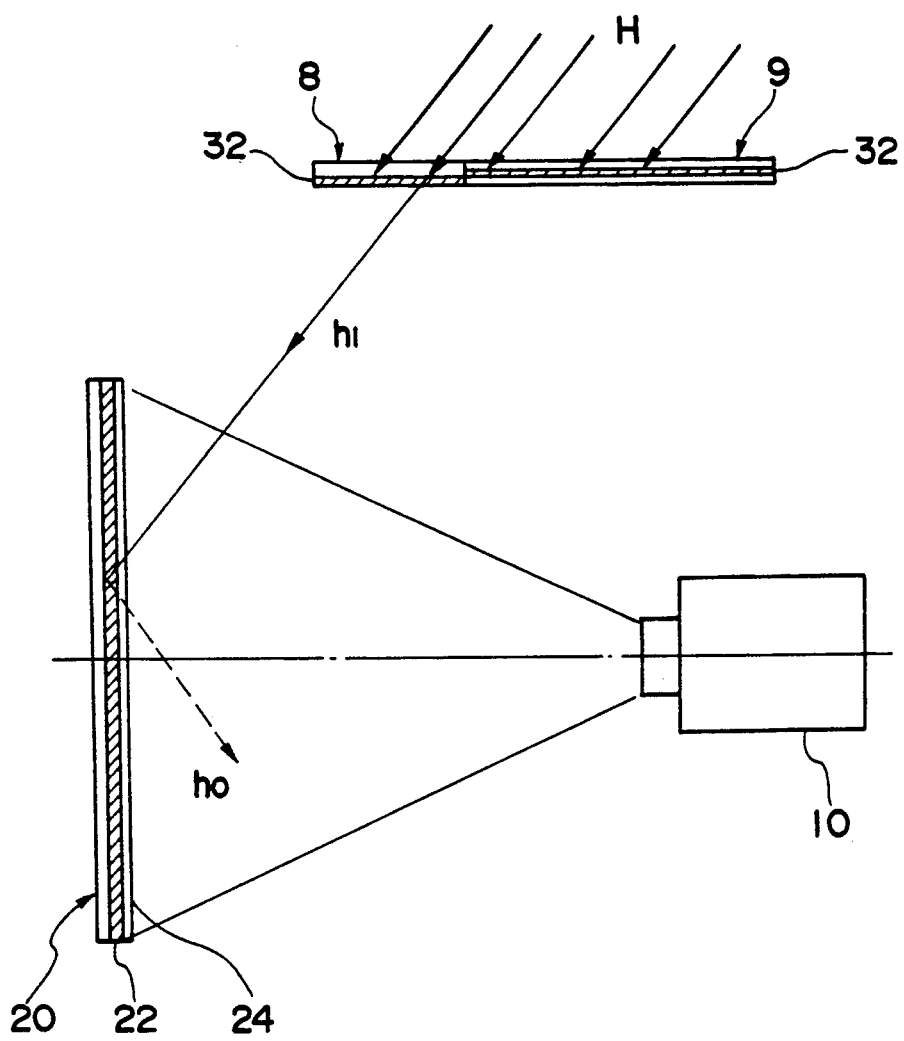
FIG. 1 is an explanatory view showing the embodiment of the present invention.
Figure 2:
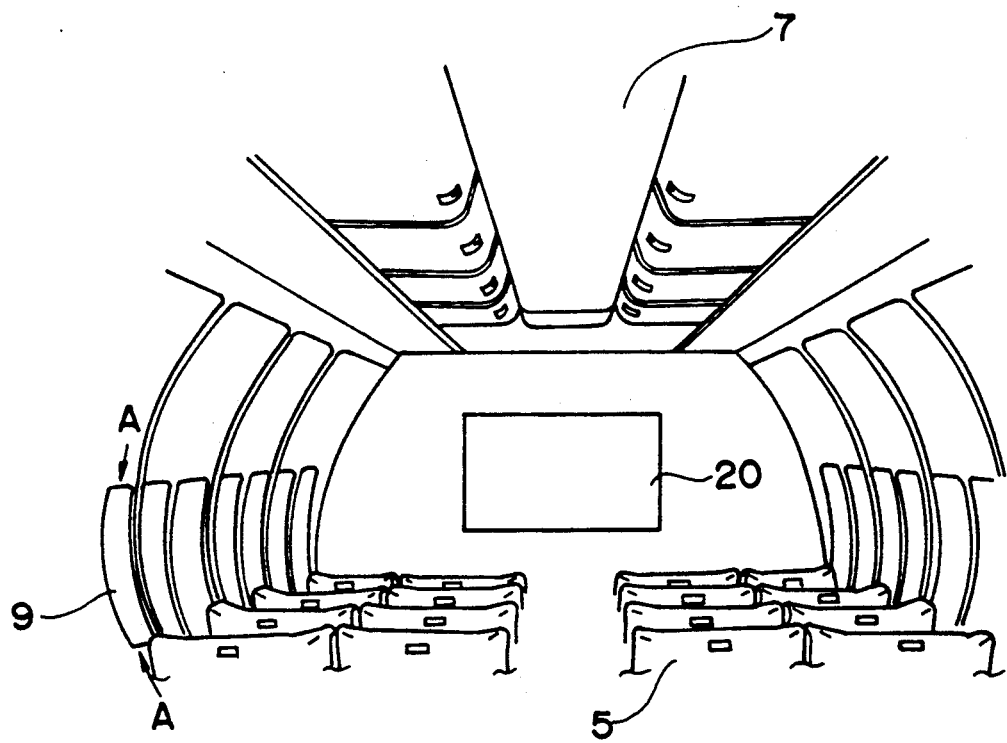
FIG. 2 is an explanatory view of the interior of an airplane.
Figure 3:
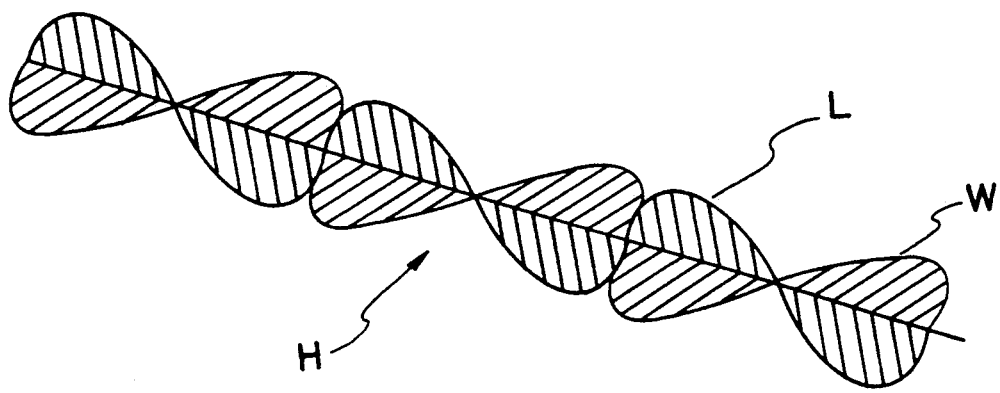
FIG. 3 is an explanatory view of the outer light.
Figure 4:
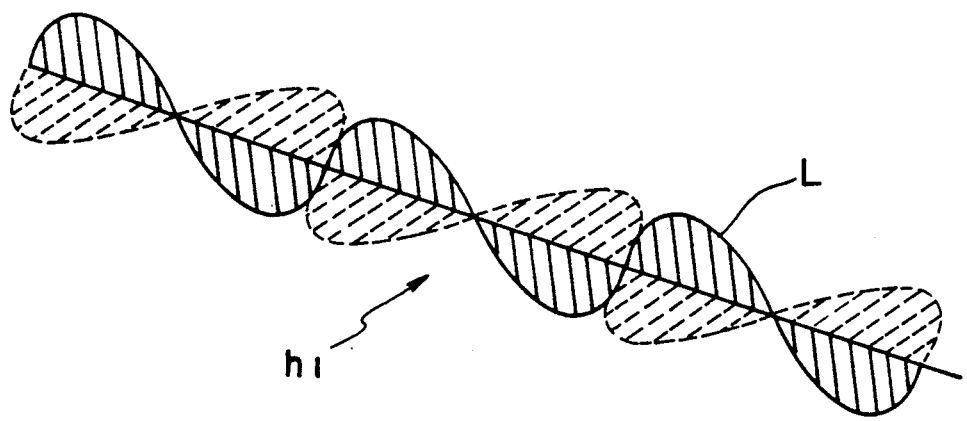
FIG. 4 is an explanatory view of the transmission light.
Figure 5:
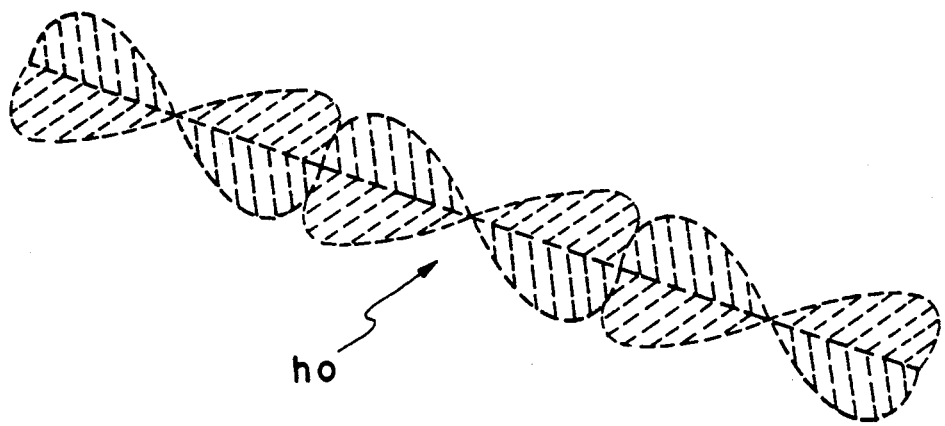
FIG. 5 is an explanatory view of the reflection.

FIG. 1 is an explanatory view on how to use the present invention, and FIG. 2 is an explanatory view of the interior of an airplane.

Inside the airplane, a screen 20 for showing the picture projected from the projector (not shown) hung from the ceiling 7 is placed in front of the seats 5. Also, window glasses 9 for taking in outer light are formed on the both side walls of the airplane.

The screen 20 is a reflecting type screen, and a first polarizing film 22 is stuck to the projecting side of screen 20. Further, a reflection preventing film 24 is stuck to the surface of the first polarizing film 22. It is preferable for the screen 20 to be in a cured state.

On the other hand, a second polarizing film 32 is stuck to the interior side of the window glasses 9 of the airplane. A polarizing film having the same polarizing trait as the first polarizing film 22 is used as the second polarizing film 32. And the second polarizing film 32 is stuck to the window glasses 9 so that its plane of polarization is right-angled to that of the first polarizing film 22. Further, the polarizing film 32 having the same trait as the first polarizing film 22 stuck onto the screen 20 will be stuck to the surface of the cover 8 of the room light (not shown) so that its plane of polarization is right-angled to that of the first polarizing film 22.

Figure 6:
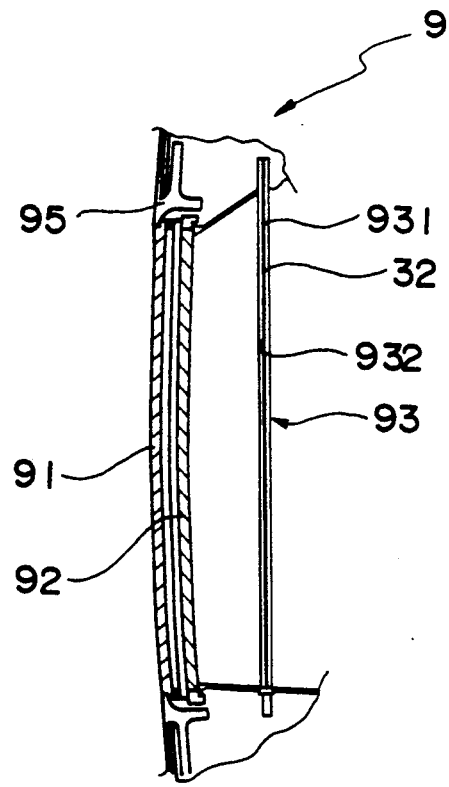
FIG. 6 is a cross-sectional view taken at line A—A of FIG. 2.

The attaching method of the second polarizing film 32 to the window glasses 9 will now be explained with reference to FIG. 6 showing the cross sectional view taken at line A—A of FIG. 2.

A polarizing film is directly stuck onto the surface of the window glass. Or the window glass 9 shown in this embodiment has a structure where a middle panel 92 lies inbetween an outer panel 91 and an inner panel 93 which are in a piled state and being gathered by a window frame 95. Further, the inner panel 93 holds the second polarizing film 32 inbetween the two acrylic boards 931, 932 to form a polarizing panel having high durability.

The operation of the picture projecting device placed inside an airplane having the above mentioned structure will now be explained. Outer light H such as sun light and room light consists of a vertical plane of polarization L and a horizontal plane of polarization W. This light H of every direction is directly polarized by the second polarizing film 32 stuck onto the window glasses 9 and the room light cover 8, thus being projected onto the surface of the screen 20 as a transmission light h1 having a vertical plane of polarization L. The plane of polarization of the first polarizing film 22 on the screen 20 being right-angled to that of the second polarizing film, the incident light reduces 100% and the reflection h0 reflecting from the screen 20 wilt be zero.

So, the surface of screen 20 will not be affected by outer light or the room light H, thus projecting the picture from the projector 10.

Further, when a liquid crystal type projector is used, the first polarizing film stuck onto the screen should have the same polarizing trait as that of the liquid crystal panel of the liquid crystal projector, and should be stuck to the screen with agreed plane of polarization. The second polarizing film on the window glass should be stuck in a way that the plane of polarization will be right-angled to that of the first polarizing film.

With a simple structure mentioned above, by putting a polarizing film on the input portion of outer light such as sun light and room light, and also by putting a polarizing film with the same polarizing trait as the ones on the input portion of outer light in a way that the plane of polarization will be right-angled to them, the influence of outer light to the screen surface could be cut out surely.

So by adopting the picture projecting device of the present invention, no matter what type of projector is used, there is no need to turn off the room light or to shut the window blind to make the room dark when projecting pictures in a bright room.

We claim:

1. A picture projecting device, comprising:
   an optical projector;
   a screen having a polarizing film on a surface where a picture is projected;
   means for transmitting light from an outer incident light source;
   a second polarizing film proximate said means for transmitting light which polarizes light transmitted through said means for transmitting light;
   wherein said second polarizing film has a plane of polarization with a phase differing from that of the polarizing film on the screen by 90°.

2. A picture projecting device as claimed in claim 1, wherein the polarizing film on the screen has a plane of polarization with the same phase as that of projecting light from the optical projector.

3. A picture projecting device as claimed in claim 1, wherein said screen further includes a reflection preventing film thereon over the polarizing film.

4. A picture projecting device as claimed in claim 1, wherein said means for transmitting is a window glass.

5. A picture projecting device as claimed in claim 1, wherein said means for transmitting is a room light cover.

6. A picture projecting device as claimed in claim 4, wherein said device is in an airplane and said window glass is along a side of said airplane.

7. A picture projecting device as claimed in claim 6, wherein said screen is located in a plane generally perpendicular to said window glass.

8. A picture projecting device as claimed in claim 6, wherein the polarizing film is directly stuck onto the surface of the window glass.

9. A picture projecting device as claimed in claim 6, wherein the window glass includes a panel having the second polarizing film in between two acrylic boards.

* * * * *